O. LOISEAU.
MANUFACTURE OF ZINC.
APPLICATION FILED JUNE 17, 1908.
947,831.
Patented Feb. 1, 1910.
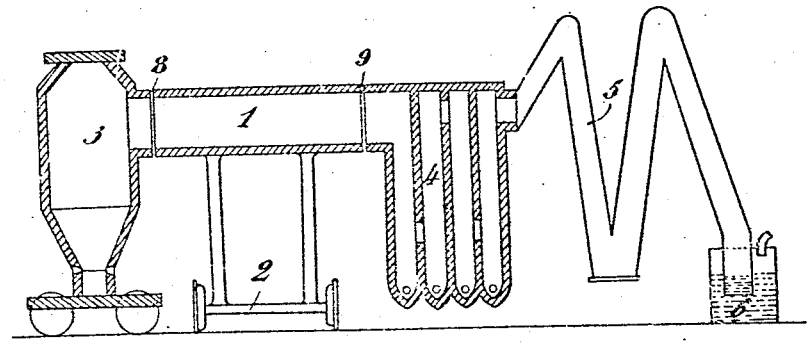
Witnesses
L. H. Latham
S. R. Harnken
Inventor,
Oscar Loiseau,
By Stewart & Stewart
His Attorneys

UNITED STATES PATENT OFFICE.

OSCAR LOISEAU, OF SCLAIGNEAUX, BELGIUM.

MANUFACTURE OF ZINC.

947,831. Specification of Letters Patent. Patented Feb. 1, 1910.

Application filed June 17, 1908. Serial No. 439,045.

*To all whom it may concern:*

Be it known that I, OSCAR LOISEAU, a subject of the King of Belgium, residing in Sclaigneaux, Province of Liege, Belgium, have invented certain new and useful Improvements in the Manufacture of Zinc; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a process for producing zinc or other metals whose ores require similar treatment by the reduction of the oxidized ores by means of carbon monoxid gas in a practically pure state not mixed with nitrogen, acting directly at the temperature necessary to obtain the reduction required under good conditions.

It is well known to metallurgists that the temperature required for the reduction of zinc ores is very high, in the neighborhood of 1400° C., and that this temperature cannot be produced by ordinary means, as in a blast furnace. The process herein described relates to the reduction of ores requiring this high temperature by means of carbon monoxid generated as hereinafter described at a temperature slightly above that at which the ore is to be reduced, the gas being applied directly to the ore, so that the heat generated by the manufacture of the gas serves to heat the ore for the purpose of reducing it.

The gas employed may be produced by the blowing over incandescent coke or anthracite of a mixture of oxygen and carbonic acid, the proportion of this latter gas in the mixture being the less the higher the temperature of the carbon monoxid gas to be produced. This reducing gas may also be obtained in any way provided that it is practically pure, is free from nitrogen and is of the required temperature.

The carbonic oxid at the temperature required for the reduction is sent into a refractory chamber of any form containing a mixture of oxidized ores and carbon. The reduction of the ores is carried out according to the usual reductions, the role of the reducing carbon in the mixture being to transform immediately into carbon monoxid the carbonic acid derived from the reduction of the ore, but, in consequence of a better impregnation of the ore by the reducing gas, the reduction can be more rapid and more complete so that the duration of the operation may be diminished and as by the direct action of this gas, acting by its own heat, the use of all the old small apparatus, distillations in closed vessels, heated exteriorly is done away with great masses of ore can be reduced in a much more simple and rapid manner. This mode of manufacture of zinc allows of the use of mechanical means for the manipulation of the materials to be treated by doing away with crucibles and muffles.

It goes without saying that the mode of carrying out this process may vary according to circumstances, the quantities of ore to be treated etc.

The drawing appended to the present specification represents diagrammatically an installation of this process in the case where the reducing gas is generated in a gas generator isolated from the chamber where the reduction of the ore is effected.

The ore mixed with carbon is placed in a refractory chamber 1 supported upon a carriage 2. The carriage allows it to be brought between the gas generator 3, which produces the hot reducing gas, and the condensing apparatus 4, suitable to bring about the condensation of the greatest possible quantity of zinc vapor to the liquid state. This condensing apparatus is connected to metal pipes 5, the office of which is to precipitate the last traces of zinc and to conduct the carbon monoxid gas, issuing from the apparatus into a hydraulic main 6 arranged so as to collect the carbon monoxid gas and keep up a fixed pressure in the whole of the apparatus. When the charge contained in the chamber 1 is reduced it is withdrawn, by removing the carriage 2 and replacing it by another similar apparatus charged with fresh ore, which may have been previously heated or not.

It is obvious that it will be necessary that all suitable means be employed to insure that the joint between the ends of the chamber 1 and the gas generator 3 on the one hand and the condenser 4 on the other hand is gas tight. This result may be obtained by placing the gas generator upon a carriage 7 moving at right angles to the carriage 2 and by allowing a certain amount of play on the supports of the carriage 2 so that when the chamber 1 is in place the movement toward the right of the gas generator 3 will close the openings 8 and 9.

The chamber 1 in which the reactions take place might be arranged in any way; it might for example be inclined or vertical. It would also be advantageous to impart a continuous rotary motion to it so as to assist the action of contact.

It should be noted that the gas collected in the hydraulic main 6 will be carbon monoxid which only differs from that produced by the gas generator 3 by its lower temperature and by the presence of certain impurities derived from the treatment of the ore and the carbon. This gas, after being purified if necessary, will be utilized in any manner. It might likewise, by means of previous reheating be mixed with the reducing gas produced by the gas generator.

Instead of generating the carbon monoxid deprived of nitrogen at the temperature required in an apparatus independent of the refractory chamber wherein the reduction of the ore is effected, it may be produced in the said chamber directly by blowing oxygen mixed with carbonic acid over a mixture in definite and sufficient proportions of coke or anthracite with the ore so that the reduction of the latter is effected in the mass directly by the action of the carbon monoxid in a practically pure state having reference particularly to absence of nitrogen and, in the nascent condition which would represent in the most simple form the realization of the principles of the new process.

Claims:—

1. Method of manufacture of zinc in which the mixture of oxidized ore and carbon is subjected to the direct reducing action of carbon monoxid in a practically pure state, not mixed with nitrogen, at the temperature required for the reduction of the zinc.

2. A process for the reduction of zinc ore which consists in blowing oxygen mixed with carbonic acid over ore mixed with carbon so that the reduction of the ore is effected by the action of carbon monoxid in a pure state and nascent condition.

3. A process for the reduction of zinc and other ores having a similar temperature of reduction which consists in generating substantially pure carbon monoxid gas at a high temperature and applying the gas directly to the ore, whereby the heat for reducing the ore is derived from the chemical action which occurs in making the carbon monoxid.

4. A process for the reduction of zinc and other ores having a similar temperature of reduction which consists in passing substantially pure oxygen and carbonic acid in contact with a mass of incandescent carbon and applying the resulting gas directly to the ore, the latter being mixed with a reducing agent, the proportion of carbonic acid being varied to give the desired temperature of reduction.

5. A process for the reduction of zinc ores which consists in applying to the ore mixed with carbon a pure oxid of carbon obtained by passing a mixture of oxygen and carbonic acid through a mass of incandescent carbon and in such a proportion that the oxid of carbon obtained will be at a temperature of about 1500° C., so that it can act continuously to reduce the ore without exterior heating.

In testimony that I claim the foregoing as my invention, I have signed my name in presence of two subscribing witnesses.

OSCAR LOISEAU.

Witnesses:
GEORGES VANDER HAEGHEN,
LEONARD LEVA.